Oct. 18, 1966   P. G. HEBNER ET AL   3,279,358
SEALING MEANS

Filed Dec. 4, 1964   2 Sheets-Sheet 1

INVENTORS.
PHILIP G. HEBNER
ROBERT R. REID
BY Sherman and Shalloway
ATTORNEYS.

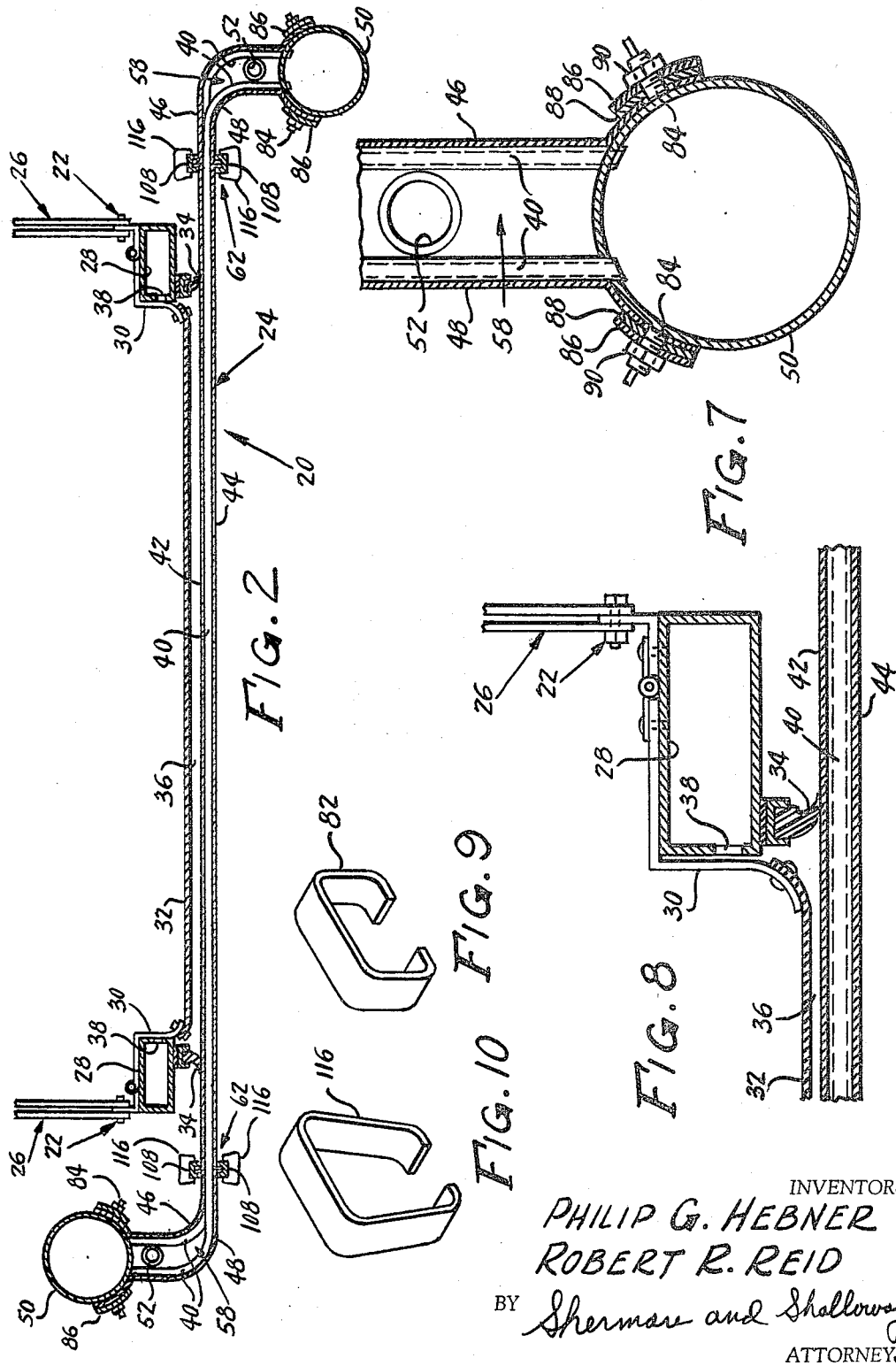

United States Patent Office 3,279,358
Patented Oct. 18, 1966

3,279,358
SEALING MEANS
Philip G. Hebner and Robert R. Reid, Seattle, Wash., assignors to The Chemithon Corporation, Seattle, Wash., a corporation of Washington
Filed Dec. 4, 1964, Ser. No. 416,066
19 Claims. (Cl. 100—90)

This invention relates to a sealing means and relates more particularly to a resilient sealing means to be used in conjunction with a device having a platen including an upper cover sheet overlying a plurality of elongated juxtaposed conduit means alternately supplied with heating and cooling fluids to increase and decrease the temperature of an article positioned on the upper cover sheet, wherein the upper cover sheet and the conduit means have a tendency to expand and contract as the temperature of the fluid supplied to the conduit means is varied thereby resulting in nonuniform contact between the platen and the conduit means using prior art constructions, the instant sealing means maintaining the desired uniform contact between the elements while allowing for expansion and contraction on passage of heating and cooling fluids through the conduit means.

In its most specific application, the instant inventive concept is designed for use with a vacuum laminating press wherein sheets of a plastic material such as a vinyl resin or polyethylene are integrally bonded to various other materials such as paper or fabrics. Such presses conventionally consist essentially of a plurality of substantially rectangular tubes extending in parallel side-by-side relationship, the tubes being connected at their opposite ends to headers for the supply of heat transfer fluids. The platen generally includes an upper cover sheet overlying the tubes on which the material to be laminated is carried. A vacuum blanket is superimposed over the upper cover sheet and maintains the article being laminated in good contact therewith.

The ordinary press cycle includes an alternate heating and cooling of the material by passage of steam or other hot fluid through the tubes followed by a cooling of the laminated article by the passage of water therethrough. While it will be readily seen that the details of the vacuum press cycle are not important to the instant inventive concept, conventionally the heating takes place for a period of approximately 20 seconds to rise to 375° F. and the cooling is completed in 60 seconds to approximately 70° F. This data is cited merely to illustrate the temperature variance occurring during the processing cycle of such presses. It will be obvious that during this cycling, expansion and contraction will take place in all directions thereby causing warping and distortion resulting in nonuniform contact between the upper cover sheet of the platen and the tubular conduit means whereby the article being laminated is subjected to uneven thermal transfer.

It is a primary object of this invention to provide a sealing means for use with a cover sheet sandwich surrounding the heating and cooling tubes, a vacuum being drawn within the sandwich to maintain uniform contact between the various parts, the sealing means being resilient to allow for the expansion and contraction occasioned by the temperature cycle while maintaining the elements in contacting relationship.

Consistent with this objective, a vacuum seal is provided in a system subjected to alternate heating and cooling cycles wherein the seal will permit relative movement between the elements without reduction of its sealing effectiveness.

A further object of the instant invention is the provision of a sealing means of the type described designed so as to preclude undesirable warping or buckling of the various parts due to the differential expansion caused by the heat transfer cycle.

An additional objective of this invention is the provision of flexible sealing means in a vacuum press or the like which is sturdy and durable in construction, reliable and efficient in operation, and relatively simple and inexpensive to manufacture, assemble, utilize and maintain.

Other and further objects reside in the combination of elements, arrangement of parts and features of construction.

Still other objects will in part be obvious and in part be pointed out as the description of the invention proceeds and as shown in the accompanying drawings wherein:

FIGURE 2 is an enlarged transverse cross-sectional view taken substantially on line 2—2 of FIGURE 1 showing a portion of a conventional vacuum frame overlying the platen;

FIGURE 7 is an enlarged fragmentary cross-sectional view illustrating in detail the relationship between the upper and lower end cover sheets, the headers and the tubular conduits;

FIGURE 8 is an enlarged fragmentary cross-sectional view showing the relationship between the vacuum frame and the platen;

FIGURE 9 is an enlarged orthographic view of one form of spring clip means for use with the side sealing means; and FIGURE 10 is an enlarged orthographic view of a similar form of spring clip means for use with the end sealing means.

Like reference characters refer to like parts throughout the several views of the drawings.

Figure 1:
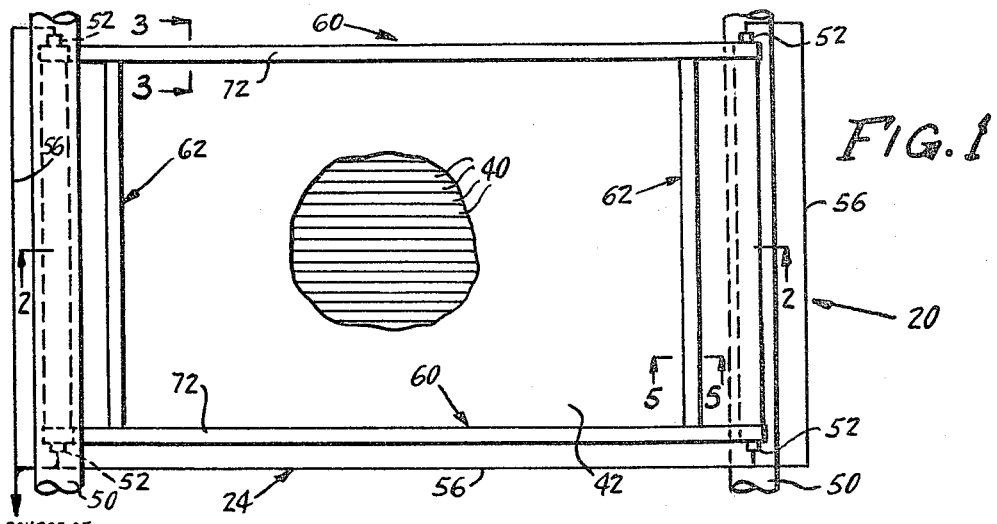
FIGURE 1 is a fragmentary top plan view of a platen forming part of a vacuum press or the like and incorporating the sealing means of this invention, parts being broken away for illustrative convenience and clarity, and the vacuum connections being shown schematically.

Referring now to the drawings, a vacuum press modified in accordance with the instant inventive concept is designated generally by the reference numeral 20 and comprises basically a vacuum frame 22 and a platen 24. The vacuum frame 22 may take any conventional form and is illustratively shown as including a vertically movable supporting frame 26 carrying a tubular peripheral vacuum chamber 28 and a blanket frame 30 supporting a resilient laminating blanket 32, the blanket 32 being sufficiently slack to operatively engage an article being laminated (not shown) carried by the platen 24. A peripheral vacuum seal 34 engages the platen 24 when the support frame 26 is in the fully down position shown in FIGURE 2 to define a cavity 36 between the blanket 32 and the platen 24. The vacuum chamber 28 includes a plurality of spaced apertures 38 communicating with the cavity 36 to pull the laminating blanket 32 into uniform contact with the material being processed which is placed on the platen 24 prior to lowering of the vacuum frame 22.

The platen 24 is supported in any desired manner such as on a table or the like (not shown) and includes a plurality of elongated juxtaposed conduit means in the form of rectangular tubes 40 extending in parallel, substantially side-by-side relationship. The tubes 40 are sandwiched within a cover sheet means including an upper cover sheet 42, a lower cover sheet 44, upper end cover sheets 46 and lower end cover sheets 48. The opposite ends of the tubes 40 are operatively connected to headers 50 for supply and removal of the heating and cooling fluids, the ends of alternate tubes 40 being welded in staggered relationship to the headers 50 to facilitate communication with the headers 50 without unduly weakening the same, and to allow a vacuum to be drawn within the cover sheet means to maintain substantially uniform contact, particularly between the upper cover sheet 42 on which the material to be laminated is supported and the tubes 40, for optimum thermal transfer. The reduction in pressure is effected by vacuum couplings 52 operatively connected to a source of vacuum 54 by a system of conduits 56 shown schematically in FIGURE 1, and communicating with chambers 58 defined between the upper and lower end cover sheets 46, 48. Note particularly FIGURES 2 and 7.

The cover sheet means is secured together in pressure tight relationship about the tubular conduit means 40 by a resilient sealing means including a side sealing means designated generally by the reference numeral 60 and an end sealing means designated generally by the reference numeral 62. The resilient sealing means maintains uniform contact between the elements while allowing for expansion and contraction of the parts on passage of heating and cooling fluids through the tubes 40 during the processing cycle.

The upper cover sheet 42 includes oppositely disposed side edges having spaced portions bent to definite downwardly extending stop members 64 and the lower cover sheet 44 includes oppositely disposed side edges having alternately spaced portions bent to define upwardly extending stop members 66, the stop members 64 and 66 engaging the outermost tubes 40 on each side of the device to preclude outward warping of the tubes. Intermediate the stop members 64, the side edges of the upper cover sheet 42 are bent to define upwardly extending side flange means 68 and intermediate the stop members 66 the side edges of the lower cover sheet 44 are bent to define downwardly extending side flange means 70. It will be seen that, in effect, the upper and lower cover sheets 42, 44 are merely reversals of each other. In addition to providing the stop members thereby precluding warping of the tubes 40, this alternate bending of the upper and lower cover sheets prevents distortion or buckling of the cover sheets themselves which would be caused by the accumulation of differential expansion over the total edge length, since the ends of the bent parts will tend to heat and cool more slowly than the portions which are closer to the tubes.

Figure 3:
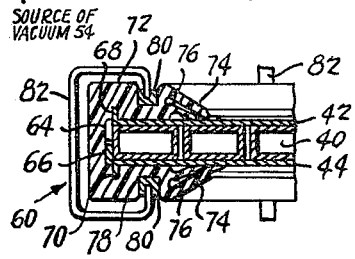
FIGURE 3 is a fragmentary enlarged cross-sectional view particularly showing the side sealing means and taken substantially on line 3—3 of FIGURE 1.
Figure 4:
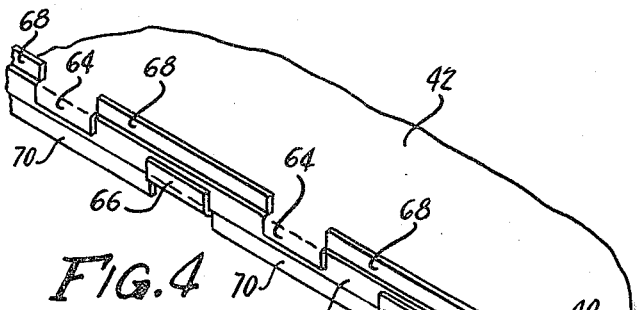
FIGURE 4 is a fragmentary orthographic view showing the relationship between the side edges of the cover sheet means and the tubular conduits.
Figure 5:
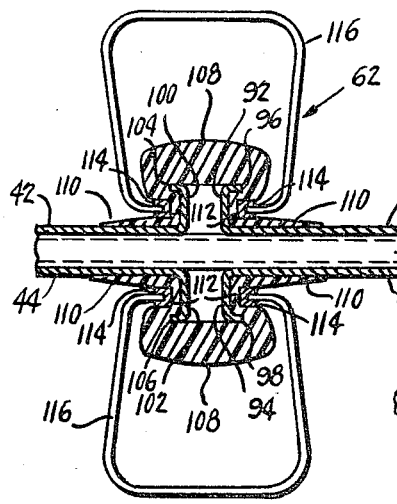
FIGURE 5 is a fragmentary enlarged cross-sectional view particularly showing the end sealing means taken substantially on line 5—5 of FIGURE 1.
Figure 6:
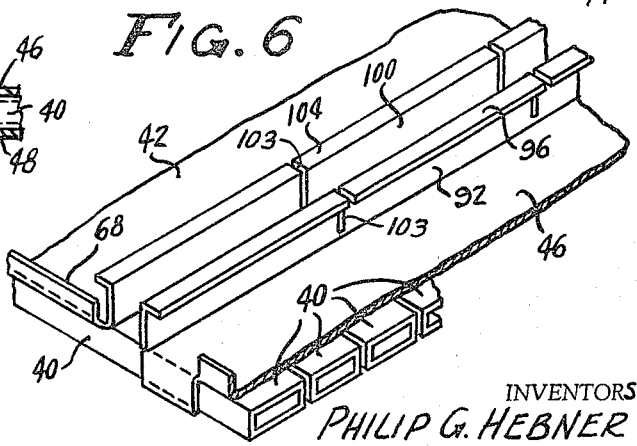
FIGURE 6 is a fragmentary orthographic view showing the relationship between the end edges of the cover sheet means and the tubular conduits.

These side edges of the upper and lower cover sheets are resiliently secured together in pressure tight relationship by elongated side gasket members 72 extruded to receive the stop members and the side flange means and preferably formed of a silicone rubber such as the material sold under the trade name "Silastic" manufactured by the Dow Chemical Company, this material having been found to withstand the relatively large temperature changes in a particularly desirable manner. As will be seen from the drawings, the side gasket members 72 each include bifurcated leg portions sealingly engaging the upper surface of the upper cover sheet 42 and the lower surface of the lower cover sheet 44 with a connecting portion extending between the leg portions. The leg portions preferably each terminate in a relatively thin flap element 74 which may be slotted as shown at 76 in FIGURE 3, if desired, to improve the flexibility.

A considerable force is required to prevent the cover sheets from creeping during the cycling. For this reason, the leg portions of the side gasket members 72 include elongated depressions 78 in which rigid bar members 80 are carried. The bar members 80 are grooved or slotted to receive terminal ends of substantially C-shaped side spring clips 82 placed across the joint. The bar members 80 distribute the load of the clips 82 and prevent rupturing of the side gasket members 72. The clips 82, one illustrative form of which is shown in detail in FIGURE 9, are secured approximately every six inches to maintain a good sealing relationship between the leg portions of the side gasket members 72 and the upper and lower cover sheets 42, 44, respectively.

The end sealing means 62 is similar in form to the side sealing means 60. The upper and lower end cover sheets 46, 48 are secured to the headers 50 in any conventional manner, a preferred construction being shown in the drawings. As shown particularly in FIGURES 2 and 7, a plurality of bolt members 84 are carried by the headers 50 and are secured by nuts 90 to curved backing strips 86 carrying resilient gasket means 88 pressed against the arcuate lower edges of the upper and lower end cover sheets 48, 46 to seal the same in pressure tight relationship. The opposite terminal portions of the upper and lower end cover sheets 46, 48 extend above and below the tubes 40 respectively, adjacent the ends of the tubes. These terminal portions are bent to define upwardly and downwardly extending upper and lower end flange means 92, 94 which are reverted at 96, 98.

The upper and lower cover sheets 42, 44 each include oppositely disposed end edges juxtaposed to the terminal portions of the upper and lower end cover sheets 46, 48, these end edges being bent to define upwardly and downwardly extending upper and lower end flange means 100, 102, similar to the end flange means 92, 94 and having reverted portions 104, 106, respectively.

All of the upper and lower end flange means are preferably slit at spaced intervals to provide slits 103 to prevent distortion of these portions due to accumulated differential expansion occurring during the heating and cooling cycles.

The end sealing means 62 includes elongated resilient end gasket members 108 secured between adjacent upper and lower end flange means 92, 100 and 94, 102, respectively. Each of the end gasket members 108 includes bifurcated leg portions terminating in relatively thin flap elements 110 sealingly engaging the upper and lower surfaces of the upper and lower cover sheets 42, 44 and the upper and lower end cover sheets 46, 48, with a connecting portion extending between the leg portions.

Elongated depressions 112 are defined in the leg portions and carry rigid bar members 114 similar to the bar members 80 and having slots or grooves receiving the terminal ends of spaced substantially C-shaped end spring clips 116, shown illustratively in FIGURE 10.

The upper and lower end cover sheets 46, 48 may have their side edges bent to define side flange means and stop members similar to those on the upper and lower cover sheets 42, 44 and the side sealing means 60 may extend to include these elements.

The dimensions and materials of the various parts described hereinabove may vary depending upon the particular use to which the device is to be put. Generally, however, the tubes 40 and at least the upper cover sheet 42 are formed of a relatively highly heat conductive material such as stainless steel or aluminum.

The use and operation of the device of the instant invention will now be apparent. With all of the elements assembled as shown in the drawings, material to be processed is placed on the upper cover sheet 42 and the vacuum frame 22 is lowered in any conventional manner until the blanket 32 engages the material and the vacuum seal 34 engages the upper cover sheet. A vacuum is drawn through the apertures 38 whereby the material is pressed together in laminating relationship between the blanket 32 and the upper cover sheet 42. A vacuum is also drawn from the source 52 thereby sandwiching the tubes 40 within the cover sheet means providing substantially uniform contact, particularly between the upper cover sheet 42 and the tubes 40. Steam or other heating fluid may then be supplied from a source (not shown) through one of the headers 50 to the tubes 40, condensate or cooled fluid being withdrawn from the other header. The material being laminated is uniformly heated by the upper cover sheet during this portion of the cycle while the same is vacuum pressed by the blanket 32. As soon as the heating step has been completed, a cooling fluid is supplied to the tubes 40 from a source (not shown) connected to one of the headers 50 whereby the laminated article is set. The resilient sealing means maintains the uniform contact between the elements of the platen while allowing for the expansion and contraction caused by the temperature variation during the cycle. When the cooling is completed the vacuum frame is lifted and the laminated article removed and replaced by additional material to be processed.

It will now be seen that there is herein provided an improved sealing means, particularly illustrated as effective in a vacuum press subject to relatively large temperature changes, the sealing means disclosed satisfying all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense. Accordingly, what is claimed is:

1. In a device having a platen including an upper cover sheet overlying a plurality of elongated juxtaposed conduit means alternately supplied with heating and cooling fluids to increase and decrease the temperature of an article positioned on said upper cover sheet wherein said upper cover sheet and said conduit means have a tendency to expand and contract as the temperature of the fluid supplied to said conduit means is varied thereby resulting in non-uniform contact between same, the improvement which comprises cover sheet means sandwiching the conduit means therebetween, said cover sheet means including said upper cover sheet and a lower cover sheet, vacuum means for reducing the pressure between said upper and lower cover sheets thereby maintaining substantially uniform contact of said upper cover sheet with said conduit means, and resilient sealing means securing said cover sheet means together in pressure tight relationship about the conduit means while allowing for expansion and contraction on passage of heating and cooling fluids through said conduit means.

2. The structure of claim 1 wherein said conduit means includes a plurality of substantially rectangular tubes extending in parallel, substantially side-by-side relationship.

3. The structure of claim 2 wherein said upper and lower cover sheets each include oppositely disposed side edges, said sealing means including resilient side sealing means securing adjacent side edges of said upper and lower cover sheets together in pressure tight relationship about said tubes.

4. The structure of claim 3 wherein said side edges of said upper cover sheet have spaced portions bent to define downwardly extending stop members on each side of said upper cover sheet, and said side edges of said lower cover sheet have alternately spaced portions bent to define upwardly extending stop members on each side of said lower cover sheet, said stop members of said upper and lower cover sheets engaging the outermost of said tubes on each side of the device to preclude outward warping of said tubes.

5. The structure of claim 3 wherein at least portions of said side edges of said upper cover sheet are bent to define upwardly extending side flange means on each side of said upper cover sheet, and at least portions of said side edges of said lower cover sheet are bent to define downwardly extending side flange means on each side of said lower cover sheet, said side sealing means including an elongated resilient side gasket member secured between adjacent upwardly and downwardly extending flange means on each side of said upper and lower cover sheets.

6. The structure of claim 5 wherein each of said side gasket members includes bifurcated leg portions sealingly engaging the upper surface of said upper cover sheet and the lower surface of said lower cover sheet, respectively and a connecting portion extending between said leg portions.

7. The structure of claim 6 wherein said leg portions each terminate in a relatively thin flap element.

8. The structure of claim 6 further including a plurality of spaced clip members engaging said leg portions of each side gasket member and resiliently biasing the same into contact with said upper and lower cover sheets.

9. The structure of claim 8 wherein each of said leg portions of said side gasket members includes an elongated depression, rigid bar members carried in each of said depressions, said clips engaging said bar members to evenly distribute the pressure of said clips on said side gasket members.

10. The structure of claim 9 wherein each of said bar members includes portions defining an elongated slot, each of said clips being substantially C-shaped and having terminal ends engaged in said slots.

11. The structure of claim 2 wherein said tubes have their opposite ends operatively connected to headers for supply and removal of the heating and cooling fluids.

12. The structure of claim 11 wherein said cover sheet means includes upper and lower end cover sheets sealed to said headers and having terminal portions extending above and below said tubes, respectively, adjacent the ends of the same, said upper and lower cover sheets each including oppositely disposed end edges juxtaposed to said terminal portions of said upper and lower end cover sheets, respectively, said terminal portions of said upper end cover sheet and said end edges of said upper cover sheet being bent to define upwardly extending upper end flange means, said terminal portions of said lower end cover sheet and said end edges of said lower cover sheet being bent to define downwardly extending lower end flange means, said sealing means including resilient upper and lower end sealing means securing adjacent upper and lower end flange means, respectively, in pressure tight relationship about said tubes.

13. The structure of claim 12 wherein portions of each of said end flange means define spaced slits to preclude distortion of said end flange means on heating and cooling of the same.

14. The structure of claim 13 wherein said end sealing means includes an elongated end gasket member secured between adjacent upper and lower end flange means, respectively.

15. The structure of claim 14 wherein each of said end gasket members includes bifurcated leg portions sealingly engaging said adjacent upper and lower end flange means and a connecting portion extending between said leg portions.

16. The structure of claim 15 wherein said leg portions each terminate in a relatively thin flap element.

17. The structure of claim 15 further including a plurality of spaced clip members engaging said leg portions of each end gasket member and resiliently biasing the same into contact with said end flange means.

18. The structure of claim 17 wherein each of said leg portions of said end gasket members includes an elongated depression, rigid bar members carried in each of said depressions, said clips engaging said bar members to evenly distribute the pressure of said clips on said end gasket members.

19. The structure of claim 18 wherein each of said bar members includes portions defining an elongated slot, each of said clips being substantially C-shaped and having terminal ends engaged in said slots.

References Cited by the Examiner

UNITED STATES PATENTS

| | | | |
|---|---|---|---|
| 1,782,852 | 11/1930 | Jeffray | 100—90 |
| 1,914,392 | 6/1933 | Worrall | 100—90 |
| 2,990,872 | 7/1961 | Gaby | 100—93 |
| 3,027,288 | 3/1962 | Keslar | 100—90 X |
| 3,119,728 | 1/1964 | Janapol | 100—93 X |

LOUIS O. MAASSEL, *Primary Examiner.*